US008694292B2

(12) United States Patent
Peterman et al.

(10) Patent No.: US 8,694,292 B2
(45) Date of Patent: Apr. 8, 2014

(54) METHOD AND SYSTEM FOR ESTIMATING BUILDING PERFORMANCE

(75) Inventors: Andrew Samuel Peterman, Santa Monica, CA (US); Benedict Schwegler, Long Beach, CA (US); Daniel Tarlow, San Francisco, CA (US)

(73) Assignee: Disney Enterprises, Inc., Burbank, CA (US)

(*) Notice: Subject to any disclaimer, the term of this patent is extended or adjusted under 35 U.S.C. 154(b) by 965 days.

(21) Appl. No.: 12/317,191

(22) Filed: Dec. 19, 2008

(65) Prior Publication Data

US 2010/0057416 A1 Mar. 4, 2010

Related U.S. Application Data

(60) Provisional application No. 61/190,566, filed on Aug. 29, 2008.

(51) Int. Cl.
*G06G 7/48* (2006.01)
*G06G 7/66* (2006.01)
*G06G 7/68* (2006.01)

(52) U.S. Cl.
USPC .................................................. 703/6; 703/2

(58) Field of Classification Search
None
See application file for complete search history.

(56) References Cited

U.S. PATENT DOCUMENTS

| | | | |
|---|---|---|---|
| 6,415,276 B1 | 7/2002 | Heger et al. | |
| 7,010,513 B2 | 3/2006 | Tamura | |
| 7,027,055 B2 | 4/2006 | Anderson et al. | |
| 7,085,683 B2 | 8/2006 | Anderson et al. | |
| 2002/0010691 A1 | 1/2002 | Chen | |
| 2003/0093514 A1 | 5/2003 | Valdes et al. | |
| 2004/0059436 A1 | 3/2004 | Anderson et al. | |
| 2006/0033625 A1 | 2/2006 | Johnson et al. | |
| 2006/0106530 A1 | 5/2006 | Horvitz et al. | |
| 2006/0106743 A1 | 5/2006 | Horvitz | |
| 2007/0003141 A1 | 1/2007 | Rittscher et al. | |
| 2007/0282768 A1 | 12/2007 | Chang et al. | |

OTHER PUBLICATIONS

Naticchia et al. "Bayesian Network model for the desing of roofpond equipped buildings" Sep. 1, 2006, Energy and Buildinsg Vo. 39, pp. 258-272.*
Hruschka et al. "Bayesian networks for imputation in classification problems", J Intel Inf Systems, Jan. 24, 2007, pp. 231-252.*
Ben-Gal, I. Bayesian Networks, 2007, Encyclopedia of Statistics in Quality & Reliability, 6 pages.*

(Continued)

*Primary Examiner* — Suzanne Lo
(74) *Attorney, Agent, or Firm* — Farjami & Farjami LLP

(57) ABSTRACT

There is provided a system of estimating a building performance, the system comprising a memory configured to store instructions comprising a method of estimating the building performance and a processor interactively linked to the memory. The processor is configured to execute the method by designating a plurality of building performance variables for estimating the building performance, identifying an interaction network correlating a model building performance representative of the building performance with the designated plurality of building performance variables, selecting a known performance of at least one model structure as a proxy for the building performance, determining learned values for a plurality of initially unknown parameter values from the interaction network and the at least one model structure having the known performance, and utilizing the learned values in the interaction network to estimate the building performance.

20 Claims, 5 Drawing Sheets

(56) References Cited

OTHER PUBLICATIONS

Jensen et al. "A Bayesian Network approach to the evaluation of building design and its consequences for employee performance and operational costs", Apr. 20, 2008, Building and Environment, No. 44, pp. 456-462.*

Yalcintas et al. "Artificial neural networks applications in building energy predictions and a case study for tropical climates", International Journal of Energy Resrach, 2005, 29, pp. 891-901.*

Karatasou et al. "Modeling and predicting building's energy use with artificial neural networks: Methods and results", 2006, Energy and Buildings, 38, pp. 949-958.*

Bourgeois et al. "Assessing the total energy impact of occupant behavioural response to manual and automated lighting systems" Ninth International IBPSA Conference, Aug. 15-18, 2005, 99-106.*

Frey, H. Christopher, *Final Report: Probabilistic Modeling of Variability and Uncertainty in Urban Air Toxics Emissions*, North Carolina State University National Center for Environmental Research EPA Grant R826790, pp. 1-5 (Sep. 2001).

Zimmerman, Dale, and Cowles, Mary Kathryn, *Combining Environmental Data Using Bayesian Hierarchical Space-Time Models*, Public Health GIS News and Information, No. 46, National Center for Environmental Research EPA Grant R826887, pp. 14-15 (May 2002).

Energy Information Administration. 2003. Commercial Building Energy Consumption Survey (CBECS) Jun. 28, 2009 <http://www.eia.doe.gov/emeu/cbecs>, 2 pages.

Ibrahim, et al., *CAD Smart Objects: Potentials and Limitations*, eCAADe 21 (2008), 6 pages.

International Performance Measurement and Verification Protocol vol. III, Chapter 4: Measurement and Verification Methods, www.ipmvp.org (2003), 31 pages.

National University of Singapore Center for Total Building Performance. e-Entergy. Apr. 28, 2009 <http://www.bdg.nus.edu.sg/buildingEnergy/e_energy/index.html>, 2 pages.

Olofsson, et al., *Rating the Energy Performance of Buildings*, eScholarship Repository, University of California (2004), 20 pages.

Reddy, et al., *Calibrating detailed building energy simulation programs with measured data—Part II: application to three case study office buildings (RP-1051)*, HVAC & R Research (Mar. 2007), 16 pages.

Yang, et al., *Building Energy Prediction with Adaptive Artificial Neural Networks*, Proceedings of the IBPSA Building Simulation (2005), 8 pages.

Neal, et al., *A view of the EM Algorithm that Justifies Incremental, Sparse, and Other Variants*, University of Toronto (1998).

Frey, Bendan J., *A Comparison of Algorithms for Inference and Learning in Probabilistic Graphical Models*, IEEE Computer Society, p. 1-25 (2005).

Wong, et al., *Bayesian adaptive comfort temperature (BACT) of air-conditioning system in subtropical climate*, Elsevier Ltd. (2006).

*The Building Energy Simulation User News*, vol. 20, No. 4, Simulation Research Group at Lawrence Berkeley National Laboratory (1999).

Arnold, et al., *The Use of Building Simulation by a Private Consultancy in New Zealand*, Ninth International IBPSA Conference (Aug. 2005).

Satti, et al., *Issues of Integrating Building Codes in CAD*, 1st ASCAAD International Conference, e-Design in Architecture (Dec. 2004).

Han, et al., *Don't Sweat Your Privacy Using Humidity to Detect Human Presence*, 5th International Workshop on Privacy (Sep. 2007).

Cho, et al., *A Survey of High-Performance Office Buildings in the United States*, Energy Systems Laboratory (2006).

Hartmann, et al., *Applications of BIM and Hurdles for Widespread Adoption of BIM 2007 AISC-ACCL eConstruction Roundtable Event Report*, CIFE Working Paper #WP105 Stanford University (revised Feb. 2008).

Wetter, et al., *A comparison of deterministic and probabilistic optimization algorithms for nonsmooth simulation-based optimization*, Elsevier Ltd. (2004).

Wetter, et al., *Comparison of a Generalized Pattern Search and a Genetic Algorithm Optimization Method*, Eighth International IBPSA Conference (2003).

Chimack, et al., *Determining Baseline Energy Consumption and Peak Cooling Loads of A 107-Year-Old Science Museum Using Doe 2.1e*, Seventh International IBPSA Conference (2001).

Pan, et al., *The Application of Building Energy Simulation and Calibration in Two High-Rise Commercial Buildings in Shanghai*, Proceedings of SimBuild (2006).

Polak, et al., *Generalized Pattern Search Algorithms with Adaptive Precision Function Evaluations*, SIAM Journal on Optimization, Society for Industrial and Applied Mathematics (2006).

Lee, et al., *Evaluation of Methods for Determining Demand-Limiting Setpoint Trajectories in Commercial Buildings Using Short-Term Data Analysis*IBPSA-USA National Conference, SimBuild (2006).

O'Donnell, et al., *BuildingPI: A Tool for Building Life Cycle Analysis*, Proc. SimBuild 2004, Building Sustainability and Performance Through Simulation, Aug. 4-6, (2004).

Neto, et al., *Use of Simulation Tools for Managing Buildings Energy Demand*, Proceedings: Building Simulation (2007).

*ASHRAE Handbook*, American Society of Heating, Refrigerating and Air-Conditioning Engineers, Inc. (1997-2000).

Tao, et al., *Mechanical and Electrical Systems in Buildings $2^{nd}$ Edition*, Chapter 2, pp. 27-47. Jan. 15, 2011.

*Getting Started with Energy Plus, Basics Manual—Essential Information You Need about Running EnergyPlus*, ENERGYPLUS (Nov. 7, 2007).

Hand, Jon W., *The ESP-r: cookbook*, (Feb. 10, 2006).

Maile, et al., *Building energy performance simulation tools—a lifecycle and interoperable perspective*, CIFE Working Paper #WP107 (Dec. 2007).

Ibrahim, et al., *The Level of Knowledge of CAD Objects within the Building Information Model*, digitalpractices tn09-051 (2003).

*Building Energy Simulation for Users of Energyplus, Spark, Doe-2, Blast, Genopt, Building Design Advisor, Energy-10 and Their Derivatives*, vol. 21 No. 6, www.DeringerGroup.com (Nov./Dec. 2000).

Bourgeois, et al., *Assessing the Total Energy Impact of Occupant Behavioural Response to Manual and Automated Lighting Systems*, Ninth International IBPSA Conference (Aug. 2005).

Syed, et al., *Analysis of the Renewable Energy Potentials in the Residential Sector of the Province of Quebec Using the Building Energy Simulation Software ESP-r*, The $5^{th}$ IBPSA—Canada Conference, pp. 151-158 (May 2008).

Swan, et al., *Canadian Housing Stock Database for Building Energy Simulation*, The $5^{th}$ IBPSA—Canada Conference, pp. 143-150 (May 2008).

Whitehead, et al., *Comparison of Tools for Design and Performance Prediction of Passive Design Elements*, The $5^{th}$ IBPSA—Canada Conference, pp. 181-188 (May 2008).

Lin, et al., *Computer Modeling of Building Energy Consumption in a Typical House in Oshawa, Ontario*, The $5^{th}$ IBPSA—Canada Conference, pp. 173-180 (May 2008).

Clarke, et al., *The EDEM Methodology for Housing Upgrade Analysis, Carbon and Energy Labeling and National Policy Development*, The $5^{th}$ IBPSA—Canada Conference, pp. 135-142 (May 2008).

Leckner, et al., *Simulating a Nzeh With a Solar Combi-System and Radiant Floor Heating*, The $5^{th}$ IBPSA—Canada Conference, pp. 33-40 (May 2008).

Fong, et al., *Comparative Study of Different Paradigms of Evolutionary Algorithm in the Context of System Optimization for Solar Desiccant Cooling*, The $5^{th}$ IBPSA—Canada Conference, pp. 41-48 (May 2008).

Kleindienst, et al., *Graphical Display for Annual Climate-Based Daylight Simulation*, The 5th IBPSA—Canada Conference, pp. 63-70 (May 2008).

Laouadi, et al., *Field Performance of Exterior Solar Shadings for Residential Windows: Winter Results*, The $5^{th}$ IBPSA—Canada Conference, pp. 127-134 (May 2008).

(56) References Cited

OTHER PUBLICATIONS

Lukomski, et al., *Evaluation of Building Electricity Consumption of Residential Dwellings in Oshawa*, The 5th IBPSA—Canada Conference, pp. 165-172 (May 2008).

Gill, et al., *Feasibility Analysis of Domestic Hot Water Systems Using TRNSYS*, The 5th IBPSA—Canada Conference, pp. 189-196 (May 2008).

Siddiqui, et al., *Investigation of the Impact of Using Thermal Mass With the Net Zero Energy Town House in Toronto Using TRNSYS*, The 5th IBPSA—Canada Conference, pp. 197-203 (May 2008).

Charles, et al., *Three Approaches to Integrating Building Performance Simulations Tools in Architecture and Engineering Undergraduate Education*, the 5th IBPSA—Canada Conference, pp. 204-211 (May 2008).

Lejevardi, et al., *Building Footprint Optimization for Two Iranian Cities Via Genetic Algorithm Application*, The 5th IBPSA—Canada Conference, pp. 212-218 (May 2008).

Laroca, et al., *Thermal Monitoring, Simulation and Evaluation of a Low-Cost Housing Prototype Built in Santa Catarina, Southern Brazil*, The 5th IBPSA—Canada Conference, pp. 219-226 (May 2008).

Parent, et al., *Energy and Health Impacts of Global Warming and Heat Island Effects in Montreal: A Case Study Introducing a Methodology Based on Statistical Matching of Recorded Weather Data*, The 5th IBPSA—Canada Conference, pp. 227-234 (May 2008).

Dutton, et al., *The Assessment of the Accuracy of Diffuse Irradiation Models and Their Potential Impact on Building Simulation*, The 5th IBPSA—Canada Conference, pp. 235-242 (May 2008).

Magnier, et al., *Multiobjective Optimization of Building Design Using Genetic Algorithm and Artificial Neural Network*, The 5th IBPSA—Canada Conference, pp. 86-93 (May 2008).

Nikolaev, et al., *A Numerical Simulation of Heat Loss From a Basement With Variable Soil Thermal Conductivity*, The 5th IBPSA—Canada Conference, pp. 99-104 (May 2008).

Kesik, et al., *Representation of Performance Indicators for the Conceptual Design of Passive Solar Houses*, The 5th IBPSA—Canada Conference, pp. 49-56 (May 2008).

Haldi, et al., *Stochastic/Probabilistic Modelling of Multiple Adaptive Processes: Some Subtle Complexities*, The 5th IBPSA—Canada Conference, pp. 111-118 (May 2008).

Ribberink, et al., *Improving ESP-R's Battery Model with Active Battery Life Control and Coverage of Vanadium Redox Flow Batteries*, The 5th IBPSA—Canada Conference, pp. 1-8 (May 2008).

Teyssedou, et al., *Computer Model of the Refrigeration System of an Ice Rink*, The 5th IBPSA—Canada Conference, pp. 9-16 (May 2008).

Sheriff, et al., *Simulations de Champs de Puits Géothermiques Verticaux de Charges Thermiques Différentes*, The 5th IBPSA—Canada Conference, pp. 17-24 (May 2008).

Ferguson, et al., *Calibration and Validation of a Combustion—Cogeneration Model*, The 5th IBPSA—Canada Conference, pp. 25-32 (May 2008).

Boivin, et al., *Refroidissement Passif: Outil d'évaluation et d'aide á la Conception Architecturale*, The 5th IBPSA—Canada Conference, pp. 57-62 (May 2008).

Lavigne, et al., *Calibration Assistée Dans la Modélisation Energétique des Bâtiments*, The 5th IBPSA—Canada Conference, pp. 71-78 (May 2008).

Bellemare, et al., *Élaboration d'un Algorithme de Génération de Zones Thermiques Visant á Faciliter la Saisie de Données á l'ineterieur d'un Logiciel de Simulation Horaire de Bâtiments*, The 5th IBPSA—Canada Conference, pp. 79-85 (May 2008).

Zhang, et al., *Finite Element Modeling for Solid-Solid Phase Change Materials With Varying Heating and Cooling Phase Change Temperatures*, The 5th IBPSA—Canada Conference, pp. 94-98 (May 2008).

Macdonald, et al., *Quantifying the Effect of Infiltration on Contaminant Concentrations for Different Emission Scenarios*, The 5th IBPSA—Canada Conference, pp. 105-110 (May 2008).

Pechacek, et al., *Combining Annual Daylight Simulation with Photobiology Data to Assess the Relative Circadian Efficacy of Interior Spaces*, The 5th IBPSA—Canada Conference, pp. 119-126 (May 2008).

Millette, et al., *Activités de Recherche en Modélisation Énergétique des Bâtiments Chez Hydro Quebec*, The 5th IBPSA—Canada Conference, pp. 159-164 (May 2008).

Wang, et al., *An Extensive Methodology for Coupling TRNSYS Components to ESP-R*, The 6th IBPSA—Canada Conference, pp. 243-250 (May 2008).

Ferguson, et al., *Modelling Integrated Mechanical Systems in Residential Housing*, The 5th IBPSA—Canada Conference, pp. 251-258 (May 2008).

Mahdavi, et al., *Analyzing Traditional Buildings Via Empirically Calibrated Building Performance Models*, IBPSA Building Simulation Conference, Beijing, China pp. 71-78 (Sep. 2007).

Ioannidou, et al., *Using 3D and Building Information Models to Verify Sustainable Design Concepts*, PowerPoint Presentation, Walt Disney Imagineering, pp. 1-23 (Mar. 2008).

\* cited by examiner

METHOD AND SYSTEM FOR ESTIMATING BUILDING PERFORMANCE

RELATED APPLICATIONS

This application claims priority to U.S. Provisional Application No. 61/190,566, filed on Aug. 29, 2008, which is hereby incorporated by reference in its entirety.

BACKGROUND OF THE INVENTION

1. Field of the Invention

The present invention relates generally to forming predictive performance models. More particularly, the present invention relates to estimating building performance.

2. Background Art

There is a desire to have aggressive performance improvement goals, such as energy reduction, for various buildings around the world. For example, developing accurate energy use estimates for a wide variety of existing and new buildings will enable facility managers to predict the optimum mix of capital improvements, occupant behavior incentives, and operational efficiency measures needed to meet these energy reduction goals.

Existing building simulation tools permit qualitative comparisons between design alternatives. These tools often fail to provide accurate quantitative predictions of real-world energy performance. Incomplete or inaccurate climate, occupancy, and behavioral data, as well as operational and maintenance constraints, are typical causes of this problem. Improved calibration can mitigate some errors for existing instrumented buildings, but it is often not feasible to install instruments, perform proper calibration, and verify results for the thousands of buildings found in large organizations.

FIG. 1 shows a diagram of a conventional approach to estimating the energy use of a building. As shown in FIG. 1, conventional process 100 utilizes a number of specific data inputs such as building geometry 102, weather conditions 104, internal energy loads, specifications for climate control systems 108 used by the building, details of operating strategies and schedules 110, and simulation specific parameters 112 that may vary for different versions of simulation engine 120 in use today. The described data inputs 102-112, or others like them, are fed into simulation engine 120, typically implemented as a black box system for producing results 130, which in the present example are intended to profile the energy use of the building under analysis.

Each of the data inputs 102-112, may themselves encompass numerous individual data values. For example, weather conditions 104 may include data from historical weather records, while internal energy loads 106 may include data describing the number of occupants per square foot of floor space, anticipated lighting needs, and the number of work stations within the building. Comparably extensive data sets may be required to fully characterize building geometry 102, and the number, size, type, and distribution of heating and air-conditioning units included in climate control systems 108.

Simulation engine 120 may utilize a set of sophisticated, but well understood thermodynamic equations to process data inputs 102-112 and provide energy use results 130. Unfortunately, it is well recognized in the art that despite the sophistication of the thermodynamics theory supporting the analysis performed by simulation engine 130, and despite the extensively detailed information typically provided by data inputs 102-112, conventional process 100 consistently provides inaccurate estimates of energy usage. In general, the errors resulting from the conventional approach to analysis just described are not due to flaws in simulation engine 120, or to insufficient comprehensiveness of data inputs 102-112. Rather, inaccuracies in results 130 flow primarily from inaccuracies in many or most of the specific data included in data inputs 102-112.

At first glance, it would seem that if all that is wrong with conventional process 100 is the accuracy of the data included in data inputs 102-112, the solution to the problem is as straightforward as improving the accuracy of that data. And it is true that a conventional approach to refining and improving results 130 may proceed by performing more precise measurements using more carefully calibrated instruments. That conventional solution can only go so far in improving the accuracy of results 130, however, for at least two important reasons.

One practical limitation to the accuracy that can be achieved by conventional process 100 or the like, is that the vast number of specific data being measured for entry into simulation engine 120 make it unlikely that all data can be provided with uniformly high accuracy. In light of the manner in which errors are known to propagate through calculations, significant errors in some measured data included in data inputs 102-112 can compromise the accuracy of results 130, regardless of the exquisite precision with which much of the other data may be recorded and entered into simulation engine 120. From a purely pragmatic standpoint, then, it appears that producing consistently reliable results from conventional process 100 may be practically impossible.

The problem of inaccuracy of results 130 is even more intractable than it seems from the foregoing discussion, however. For, even in the unlikely situation in which each data measurement performed for conventional process 100 is executed with perfect precision, and the thermodynamic equations used by simulation engine 120 are formulated with perfect rigor, results 130 are still not assured of accuracy. This is because many, if not most of the data used by simulation engine 120 cannot be precisely known, and can only be reasonably inferred. The reliability of simulation engine 120, however, is dependent upon the precision of its inputs. Thus, conventional process 100 consistently fails to produce accurate energy use estimates.

As a result of the described inaccuracy of conventional process 100, simulation engine 120 cannot be reasonably relied upon to produce quantitative results estimating energy use by a building. Instead, simulation engine 120 may be used to provide qualitative comparisons, for example, between different building geometries, or between buildings having the same building geometry located at different sites. While this outcome may have been an adequate, if less than ideal, compromise for planners in the past, the growing urgency of energy related considerations, such as the increasing cost of energy, the impact of energy consumption on global climate change, and the importance of energy independence to national security, have made the shortcomings of conventional approaches such as conventional approach 100 unacceptably limiting.

Accordingly, there is a need to overcome the drawbacks and deficiencies in the art by providing more efficient and accurate methods and systems for estimating building performance.

SUMMARY OF THE INVENTION

There are provided methods and systems for estimating a building performance, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
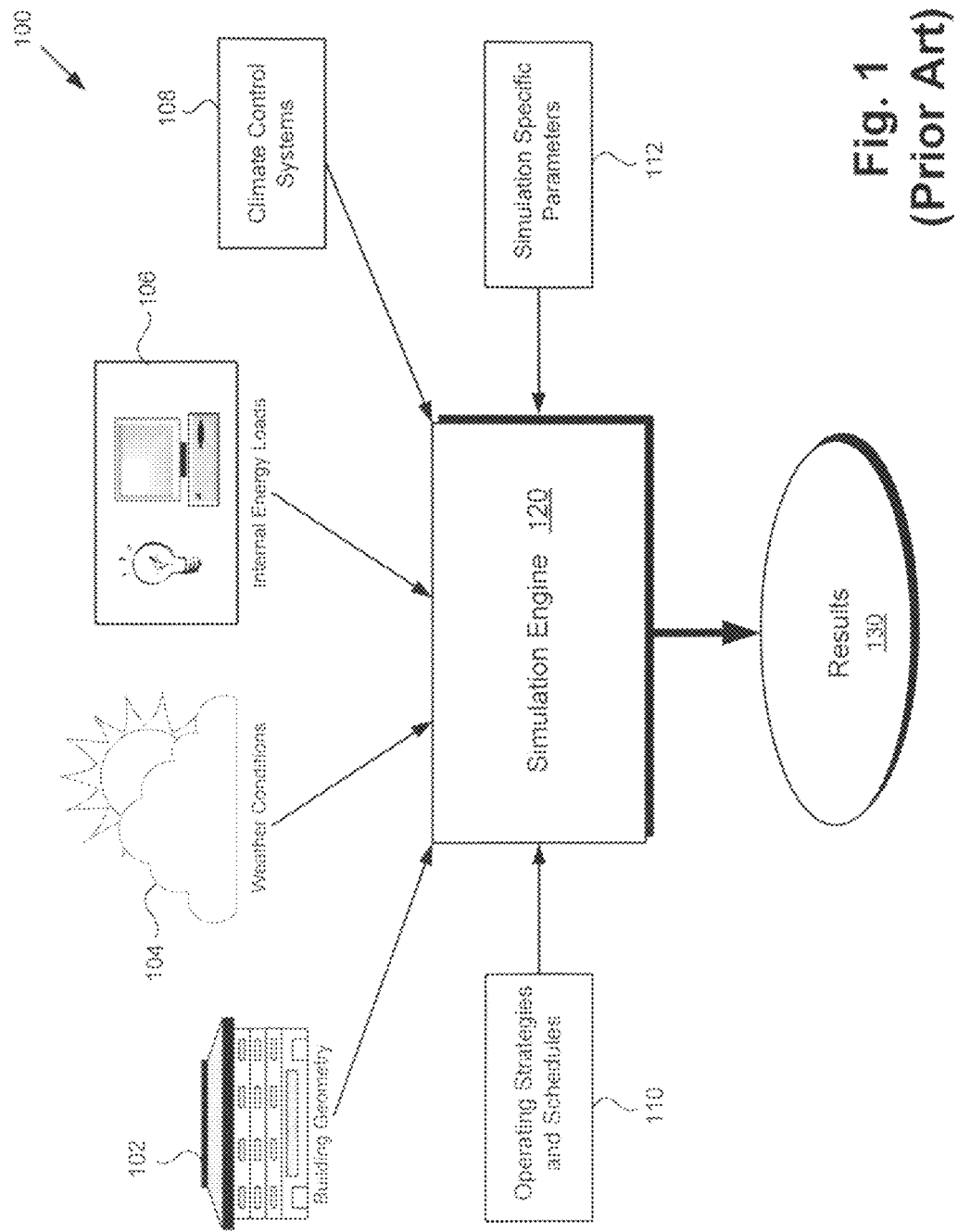
FIG. 1 shows a diagram of a conventional approach to estimating the energy use of a building.

The present application is directed to a method and system for estimating a building performance. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

The present inventors have recognized the drawbacks and deficiencies of conventional approaches to estimating building performance, and have succeeded in overcoming those disadvantages by adopting an analytical framework that acknowledges the conditional nature of much of the data required to produce such an estimate. As a result, the inventors are able to disclose a method which, at an early stage, includes designating a plurality of variables for estimating the building performance, and identifying an interaction network correlating a model building performance representative of the building performance with the designated variables.

Figure 2:
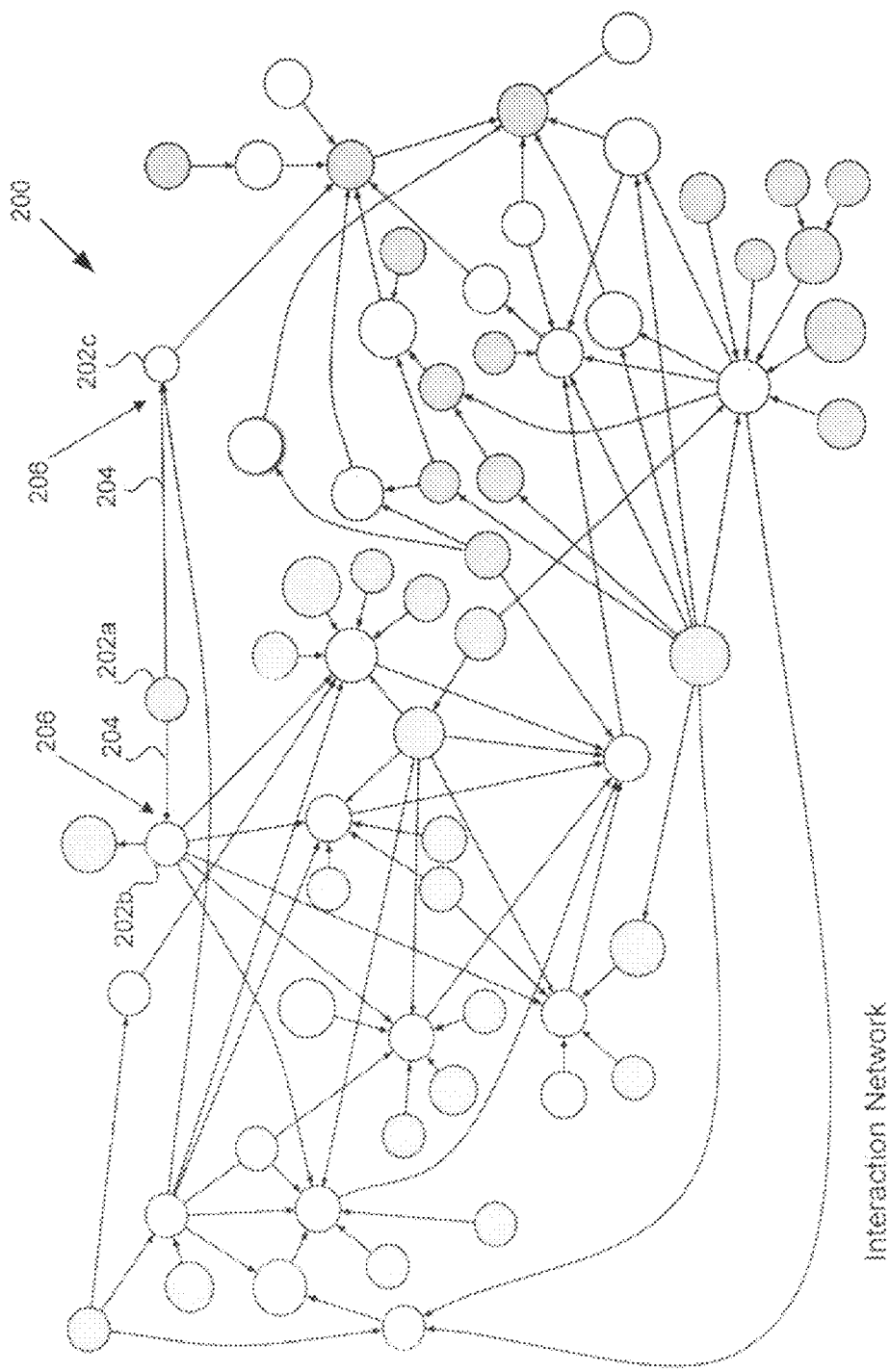
FIG. 2 shows a diagram of an interaction network for use in estimating a building performance, according to one embodiment of the present invention.

FIG. 2 shows a diagram of such an interaction network for use in estimating a building performance, according to one embodiment of the present invention. In the embodiment of FIG. 2, interaction network 200, which may be a Bayesian network, or other suitable probabilistic graphical model, for example, comprises a plurality of nodes including representative nodes 202a, 202b, and 202c. Those nodes correspond to variables designated as necessary or desirable for estimating the building performance under analysis, and interaction network 200 correlates a model building performance representative of the building performance with the designated variables. As shown in FIG. 2, the plurality of nodes comprised by interaction network 200 are connected by relational links 204, each of which has a direction 206 indicating a dependency relationship of the variables corresponding to the nodes it connects.

Continuing with FIG. 2, interaction network 200 is provided as a sample analytical framework for estimating energy use by a building. Consequently, the particular nodes present in interaction network 200 correspond in number and character to the variables designated for estimating energy use by the building. Furthermore, interaction network 200 correlates the designated variables with a theoretical model of energy use by a building that is representative of energy use by the particular building under analysis. More generally, the present approach can be applied to other types of building performance, such as energy distribution throughout a building, or the distribution of load stress in a building during a seismic event, for example.

In addition to estimating energy use or distribution, in some embodiments, the concepts disclosed in the present application may be applied to estimate the environmental impact of a building on its surroundings, for example, by estimating storm water runoff, green house gas emissions, solid waste production, and the like. In those other embodiments, an interaction network corresponding to interaction network 200 may comprise a plurality of nodes connected by directed relational links, like interaction network 200, but because those nodes would correspond to variables designated for estimating a different model building performance, their number, character, and the arrangement of their dependency relationships may differ substantially from the example shown by interaction network 200. Moreover, although the embodiment of FIG. 2 expresses the relationship among variables using directed relational links 204, in some embodiments, relational links among the nodes representing designated variables may be undirected.

According to the embodiment of FIG. 2, interaction network 200 is to be utilized for estimating energy use by a building. Thus, the nodes of interaction network 200, represented by nodes 202a, 202b, and 202c, correspond to variables designated to estimate energy use by the building. Relational links 204 show how the variables represented by the nodes of interaction network 200 relate to one another. For example, a variable linked to another variable by a relational link may affect and/or may be affected by the linked variable. The nature of the dependency relationship is indicated by direction 206, wherein a relational link pointing from a first node to a second node shows that the effect on building performance flowing from the second node receiving the directional arrow depends on the range of possible values for the variable at the first node, from which the directional arrow is pointing away. For example, when a second variable depends upon a first variable in the manner described, the value of the second variable may be treated as conditional upon the value of the first variable.

It is noted, however, that the foregoing discussion of dependency among the variables corresponding to the nodes of interaction network 200 is in no way intended to be exhaustive. For instance, although from a downstream or causal perspective, a first variable corresponding to a first node from which a directed relational link emanates (e.g., parent node 210), may be thought of as contributing to determination of a second variable corresponding to a second node to which the directed relational link points (e.g., descendant node 202b) when the first variable is observed but the second variable is not, the reverse may also hold true. That is to say, from an upstream or diagnostic perspective, despite the fact that a directed relational link points from the parent to the descendant (e.g., 202a to 202b), knowledge about the second variable corresponding to the descendant (e.g., 202b) may contribute to a determination of the value of the first variable corresponding to the parent (e.g., 202a), when that first variable is not observed.

Thus, interaction network 200 corresponds to a plurality of conditional relationships among its nodes. By graphically relating the nodes it comprises, interaction network 200 denotes the structure of local interactions among the building performance variables corresponding to those nodes. As previously mentioned, there are several different types of interaction networks presently utilized for graphical modeling, and techniques for determining global conditional independence properties from a subset of observable variables are well known. When the interaction network comprises a Bayesian network, for example, one method for determining whether two nodes are conditionally independent is known as the Bayes Ball algorithm, as is known in the art. As a result, in a Bayesian network, the distribution governing each node can be expressed as a conditional probability distribution with a probability density given as a function of its parents. As noted previously, because a given node's value may also be used to determine the distribution of its descendant nodes, knowing the value of a node's descendants will give information about the value of the given node. Formally, the most general independence statement that may typically be made is that a node is conditionally independent of all non-descendant nodes given its parents. Consequently, if a node has no parents, then it is marginally independent of all of its non-descendants in the network.

According to the present embodiment, the values associated with any single variable represented by the nodes of interaction network 200 correspond to probability distributions, rather than precise values. That is to say, the inventors have not only acknowledged the intrinsic uncertainty of the data used for modeling performance, but have incorporated that uncertainty into their novel approach. As a result, each variable represented by the nodes present in interaction network 200 corresponds to a range of possible values. In the case of variables having values that are marginally independent of its non-descendants in the interaction network, such as the variable corresponding to node 202a, those variables may be described by single-variable marginal probability distributions. For conditional variables, however, the probability distributions bounding their possible values are given by conditional probability distributions, due to their dependency on values that are themselves uncertain.

Before moving on to a more detailed description of the operation of an interaction network, such as interaction network 200, let us take a moment to summarize what FIG. 2 reveals. The present approach to estimating a building performance, as represented by the embodiment of FIG. 2, comprises designating a plurality of variables for estimating the building performance, and identifying an interaction network correlating a model building performance representative of the building performance with the designated variables. An important aspect of the present approach is identification of interaction network 200. As may be apparent from the foregoing, although interaction networks may vary depending upon the building performances they are being used to model, there is no requirement that they be building specific, i.e., they correlate variables with a model building performance representative of the building performance and may themselves be independent of the performance of any particular building. In other words, interaction network 200, which describes energy use by a building, characterizes that use in terms of relationships among variables that are characteristic of the building performance itself, rather than being characteristic of the specific building under analysis. Thus an interaction network that fully describes energy use in terms of appropriately selected variables may be applicable to numerous distinct structures.

The inventors realize that interaction network 200 can be used with a known performance of one or more model structures, the known performance serving as a computational proxy for the building performance. Using measured, measurable, or predictable data from one or more selected known performances, and using that data as a computational proxy for the estimated building performance in combination with interaction network 200, learned or calculated values may be determined for a plurality of initially unknown parameter values represented by the variables and conditional interactions captured by interaction network 200. Then, those learned values may be utilized in interaction network 200 to estimate the building performance under analysis.

Figure 3:
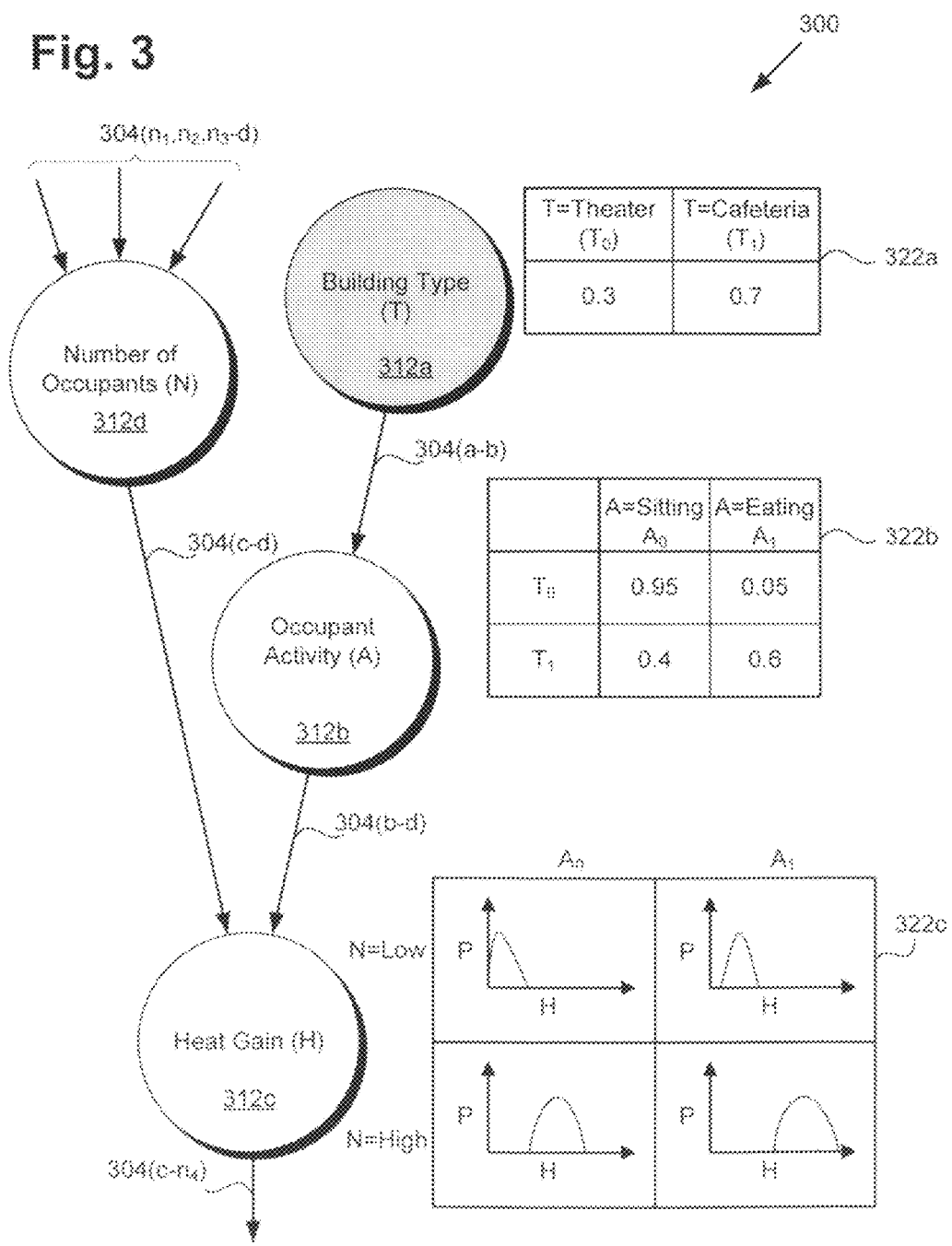
FIG. 3 shows a more detailed view of interaction among nodes occurring within a local nodal environment of an interaction network for use in estimating a building performance, according to one embodiment of the present invention.

FIG. 3 shows a more detailed view of the interaction among nodes occurring within local nodal environment 300 of an interaction network for use in estimating a building performance, according to one embodiment of the present invention. Local nodal environment 300, in FIG. 3, includes nodes 312a, 312b, 312c, and 312d. Local nodal environment 300 also includes a number of directed relational links showing the structure of the relations between nodes 312a, 312b, 312c, and 312d, as well as their relationships to other nodes within the larger interaction network, but not shown in local nodal environment 300. For example, plurality of directed relational links $304(n_1, n_2, n_3\text{-}d)$ into node 312d indicates that the value of the variable "Number of Occupants" (N), corresponding to node 312d, is influenced by the values of variables at nodes $312n_1$, $312n_2$, and $312n_3$ outside of local nodal environment 300 (not shown in FIG. 3). Similarly, directed relational link $304(c\text{-}n_4)$ indicates that the value of the variable "Heat Gain" (H), corresponding to node 312c, influences the variable at node $312n_4$ (also not shown in FIG. 3), to which directed relational link $304(c\text{-}n_4)$ points.

Also shown in FIG. 3 are probability distributions 322a, 322b, and 322c, describing the possible distribution of values for the variables represented by respective nodes 312a, 312b, and 312c. As may be seen from FIG. 3, node 312a is parent to node 312b but does not itself descend from a parent node. Thus, as previously discussed, the variable describing "Building Type" (T) represented by node 312a, can be described as marginally independent of all of its non-descendants in the network, such as node 312d in local nodal environment 300, and may be represented by single-variable marginal probability distribution 322a. As shown in FIG. 3, variable T at node 312a is represented by a discrete marginal probability distribution having two possible values, $T_0$ and $T_1$. As may be seen from discrete single-variable marginal probability distribution 322a, there is a thirty percent chance that variable T will have value $T_0$, i.e., that the building type will be a theater, and a seventy percent chance that variable T will have value $T_1$, i.e., that the building type will be a cafeteria.

As may be further seen from FIG. 3, node 312b concurrently affects node 312c, and is affected by node 312a. As a result of its conditional nature, the variable describing "Occupant Activity" (A) at node 312b is represented by discrete conditional probability distribution 322b, which shows that the occupants of the building are highly likely to be sitting and much less likely to be eating when the building is a theater, but that the likelihood that occupants are either sitting or eating is more evenly distributed when the building is a cafeteria. It is noted that although in the embodiment of FIG. 3, conditional probability distribution 322$b$ is discrete, in general, that need not be the case. Conditional probability distributions, as well as single-variable marginal probability distributions, may be either discrete or continuous, as their range of possible values dictates.

The heat gain by the building, H, corresponding to node 312$c$, is shown by continuous conditional probability distribution 322$c$ to depend on its parent nodes 312$d$ and 312$b$. Thus, the probable heat gain depends upon whether the building occupancy is high or low, as well as the likely activity of the building occupants. That activity, in turn, is influenced by the building type. The structure and quantitative influence of the interrelationship among the variables T, A, H, and N are shown respectively by local nodal environment 300, and probability distributions 322$a$, 322$b$, and 322$c$.

FIG. 2 and FIG. 3 will now be further described with reference to FIG. 4, which presents a method of estimating a building performance, according to one embodiment of the present invention. While steps 410 through 450 indicated in flowchart 400 are sufficient to describe one embodiment of the present method, other embodiments may utilize steps different from those shown in flowchart 400, or may include more, or fewer steps.

Figure 4:
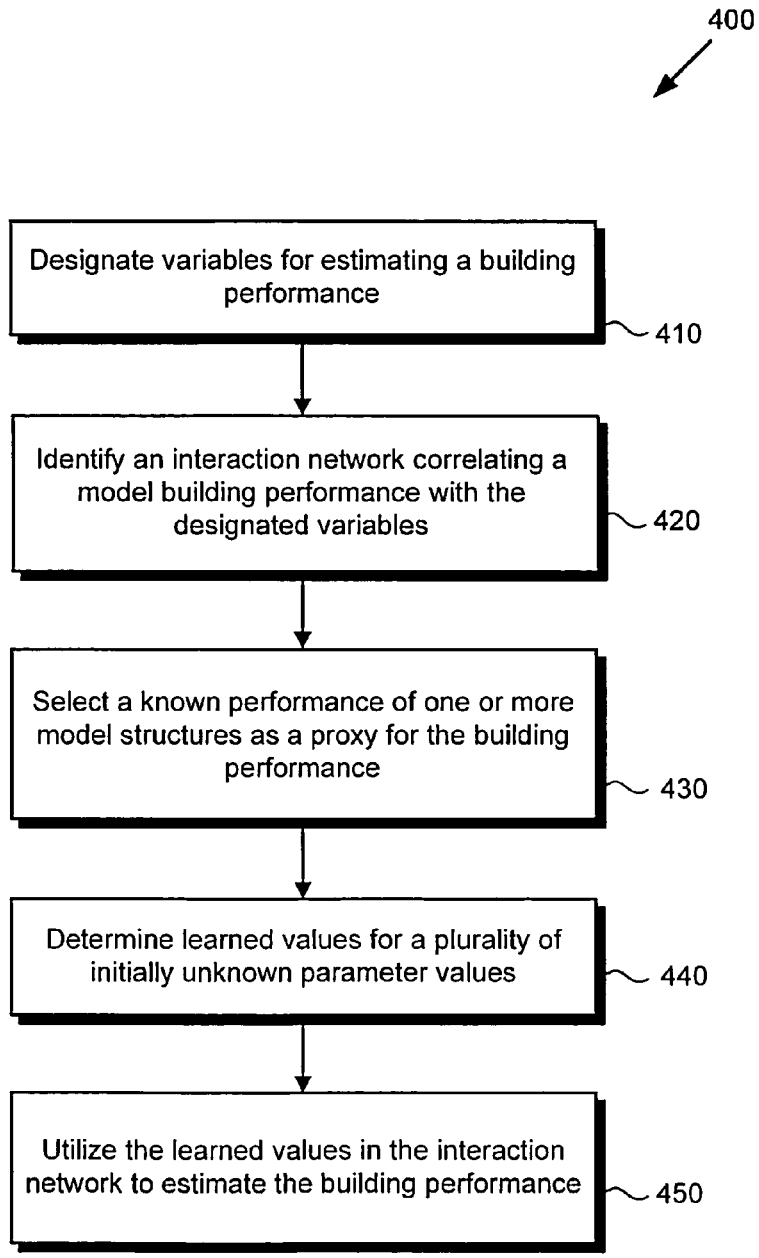
FIG. 4 is a flowchart presenting a method of estimating a building performance, according to one embodiment of the present invention.

Beginning with step 410 in FIG. 4 and referring to FIGS. 2 and 3, step 410 of flowchart 400 comprises designating a plurality of variables for estimating the building performance. In the embodiments of FIGS. 2 and 3, for example, the building performance is energy use by the building. In those embodiments, building performance variables such as T, A, H, and N, as well as the building performance variables represented by the nodes shown in interaction network 200 have been designated as necessary or desirable for estimating energy use by the building.

Continuing with step 420 of flowchart 400 and referring to FIG. 2, step 420 of flowchart 400 comprises identifying an interaction network 200 correlating a model building performance representative of the building performance with the plurality of building performance variables designated in step 410. As mentioned in conjunction with FIG. 2, in some embodiments, the interaction network identified in step 420 may comprise a probabilistic graphical model, such as a Bayesian network, for example. Identifying the interaction network in step 420 may be performed in a variety of ways. For example, in some embodiments of the present method, the interaction network may be generated on a case-by-case basis using an intelligent system and/or human input to correlate the performance under analysis with the designated variables. In other embodiments, identification of the interaction network in step 420 may be performed by a selection algorithm or other substantially automated process, by reference to a library of predetermined or partially predetermined interaction network templates, for instance.

Moving now to step 430 of Flowchart 400, step 430 comprises selecting a known performance of one or more model structures to serve as a proxy for the performance of the building. As previously explained, because interaction network 200 correlates a model building performance representative of the building performance to the designated variables, rather than being tied to a specific building structure, it may be applied to known representative building performances and structures to resolve some of the initial uncertainty associated with the building performance under analysis. In some embodiments, step 430 may correspond to selecting a known building performance of one or more previously built structures, while in other embodiments, the representation may comprise the known performance of a previously designed, but not necessarily constructed, building.

Continuing with step 440 of flowchart 400, step 440 comprises determining learned values for a plurality of initially unknown parameter values from interaction network 200 and the one or more model structures having the known performance. In one embodiment, for example, determining the learned values in step 440 may be accomplished by applying an Expectation Maximization algorithm to interaction network 200 and the one or more model structures having the known performance. More specifically, in some embodiments, a Variational Expectation Maximization Algorithm or Monte Carlo Expectation Maximization Algorithm may be applied in step 440 to determine the learned values.

The example method of flowchart 400 continues in step 450 by utilizing the learned values in interaction network 200 to estimate the building performance. For example, in some embodiments step 450 may be performed so as to find the Maximum a Posteriori (MAP) or Maximum Posterior Marginal (MPM) value of energy use conditioned upon the input variables designated in step 410.

Figure 5:
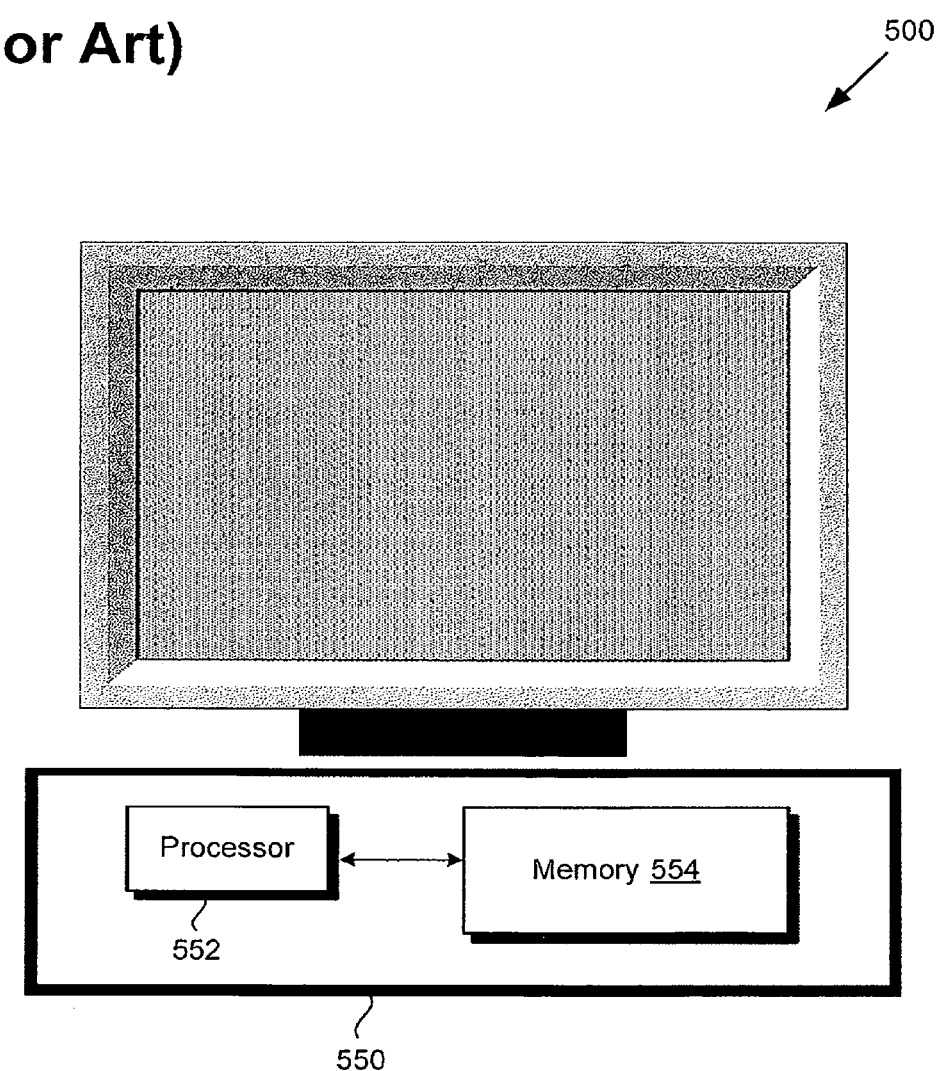
FIG. 5 shows a diagram of a system for estimating a building performance, according to one embodiment of the present invention.

Turning now to FIG. 5, FIG. 5 shows a diagram of system 500 for estimating a building performance, according to one embodiment of the present invention. As shown in FIG. 5, system 500 comprises performance simulator 550 including processor 552 and memory 554. In the embodiment of FIG. 5, processor 552, which may be the central processing unit (CPU) of performance simulator 550, for example, can be configured to execute a method for estimating a building performance, such as the example method of flowchart 400, in FIG. 4, in response to instructions stored in memory 554. As a result, processor 552 may be configured to execute actions corresponding to steps of designating a plurality of variables for estimating the building performance, identifying an interaction network correlating a model building performance representative of the building performance with the designated plurality of variables, selecting a known performance of one or more model structures as a proxy for the building performance, determining learned values for a plurality of initially unknown parameter values from the interaction network and the one or more model structures having the known performance, and utilizing the learned values in the interaction network to estimate the building performance.

In some embodiments, the present invention may be implemented through use of a computer-readable medium having stored thereon instructions for estimating a building performance, which, when executed by a processor, such as processor 552, perform a method for producing the estimate. The expression "computer-readable medium," as used in the present application, refers to any medium that provides instructions to a processor, such as memory 554, which is shown to be interactively connected to processor 552 in FIG. 5. Thus, a computer-readable medium may correspond to various types of media, such as volatile media, non-volatile media, and transmission media, for example. Volatile media may include dynamic memory, such as dynamic random access memory (dynamic RAM), while non-volatile memory may include optical, magnetic, or electrostatic storage devices. Transmission media may include coaxial cable, copper wire, or fiber optics, for example, or may take the form of acoustic or electromagnetic waves, such as those generated through radio frequency (RF) and infrared (IR) communications. Common forms of computer-readable media include, for example, a compact disc read-only memory (CD-ROM), DVD, or other optical disc; a RAM, programmable read-only memory (PROM), erasable PROM (EPROM), FLASH memory, or a transmission carrier wave.

Thus, the present application discloses a method and system for estimating a building performance that produces accurate performance estimates without the need for individual building calibration, even for buildings that have not been built or where no performance data exist. Further, the present disclosure describes an analytical framework that improves upon existing calibration procedures by integrating a probabilistic model, which includes environmental influences such as venue and surrounding activity, into a building physics model. This approach eliminates the need to calibrate each building independently, since the data typically used for calibration of these buildings is transformed into a probabilistic representation, which is used during the overall building simulation routine run for all buildings.

Using a structured probabilistic representation such as a Bayesian network, the present approach first specifies which variables interact with each other. Because real-world data is subject to random variations, the present approach models interactions between variables in the model as conditional probability distributions. Second, the parameter values for these conditional distributions are set using statistical parameter estimation methods over the detailed data already collected. With an Expectation Maximization algorithm, the present approach enables learning from existing data even when data for some variables are not observed or where parameter values are initially unknown. The disclosed framework is quite unique and innovative, and may be advantageously extensible to a wide variety of interactions between the built, natural, and human environments.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A system for estimating a building performance, the system comprising:
   a memory configured to store instructions comprising a method of estimating the building performance;
   a processor interactively linked to the memory, the processor configured to execute the method by:
      designating a plurality of building performance variables for estimating the building performance, the plurality of building performance variables including at least one occupant activity variable corresponding to an activity of an occupant of the building influenced by a type of a building;
      identifying an interaction network correlating a model building performance representative of the building performance with the designated plurality of building performance variables including the at least one occupant activity variable;
      selecting a known performance of at least one model structure as a proxy for the building performance;
      determining learned values for a plurality of initially unknown parameter values from the interaction network and the at least one model structure having the known performance;
      utilizing the learned values in the interaction network to estimate the building performance.

2. The system of claim 1, wherein the system is used to implement one of controlling the building performance during a use of the building, and predicting the building performance.

3. The system of claim 1, wherein the building performance comprises one of energy use by the building and an environmental impact of the building on its surroundings.

4. The system of claim 1, wherein the interaction network comprises a probabilistic graphical model.

5. The system of claim 1, wherein the processor is further configured to determine the learned values for the plurality of initially unknown parameter values by applying an Expectation Maximization algorithm to the interaction network and the at least one model structure having the known performance.

6. A method of estimating a building performance, the method comprising:
   designating, using a processor, a plurality of building performance variables stored in a memory for estimating the building performance, the plurality of building performance variables including at least one occupant activity variable corresponding to an activity of an occupant of the building influenced by a type of a building;
   identifying an interaction network correlating a model building performance representative of the building performance with the designated plurality of building performance variables including the at least one occupant activity variable;
   selecting a known performance of at least one model structure as a proxy for the building performance;
   determining learned values for a plurality of initially unknown parameter values from the interaction network and the at least one model structure having the known performance;
   utilizing the learned values in the interaction network to estimate the building performance.

7. The method of claim 6, further comprising using the estimated building performance to control the operation of the building during a use of the building.

8. The method of claim 6, wherein the method is used to predict the building performance and modify operation of the building to effect change in a resource consumed by operation of the building.

9. The method of claim 6, wherein the building performance comprises one of energy use by the building and an environmental impact of the building on its surroundings.

10. The method of claim 6, wherein the plurality of building performance variables comprise at least one variable represented by a single-variable marginal probability distribution and at least one variable represented by a conditional probability distribution.

11. The method of claim 10, wherein each of the respective single-variable marginal probability distribution and the conditional probability distribution is one of a continuous probability distribution and a discrete probability distribution.

12. The method of claim 6, wherein selecting the known performance of the at least one model structure as a proxy for the building performance comprises selecting the known performance of one of a previously built structure and a previously designed structure.

13. The method of claim 6, wherein the interaction network comprises a probabilistic graphical model.

14. The method of claim 6, wherein the interaction network comprises a Bayesian network.

15. The method of claim 6, wherein determining the learned values for the plurality of initially unknown parameter values comprises applying an Expectation Maximization algorithm to the interaction network and the at least one model structure having the known performance.

16. A computer-readable medium memory having stored thereon instructions for estimating a building performance, which, when executed by a processor, perform a method comprising:
    designating a plurality of building performance variables for estimating the building performance, the plurality of building performance variables including at least one occupant activity variable corresponding to an activity of an occupant of the building influenced by a type of a building;
    identifying an interaction network correlating a model building performance representative of the building performance with the designated plurality of building performance variables including the at least one occupant activity variable;
    selecting a known performance of at least one model structure as a proxy for the building performance;
    determining learned values for a plurality of initially unknown parameter values from the interaction network and the at least one model structure having the known performance;
    utilizing the learned values in the interaction network to estimate the building performance.

17. The computer-readable memory of claim 16, wherein the method further comprises using the estimated building performance to perform one of controlling the building performance during a use of the building, and predicting the building performance.

18. The computer-readable memory of claim 16, wherein the building performance comprises one of energy use by the building and an environmental impact of the building on its surroundings.

19. The computer-readable memory of claim 16, wherein the interaction network comprises a probabilistic graphical model.

20. The computer-readable memory of claim 16, wherein determining the learned values for the plurality of initially unknown parameter values comprises applying an Expectation Maximization algorithm to the interaction network and the at least one model structure having the known performance.

* * * * *

UNITED STATES PATENT AND TRADEMARK OFFICE
CERTIFICATE OF CORRECTION

PATENT NO.        : 8,694,292 B2  
APPLICATION NO.   : 12/317191  
DATED             : April 8, 2014  
INVENTOR(S)       : Peterman et al.

Page 1 of 1

It is certified that error appears in the above-identified patent and that said Letters Patent is hereby corrected as shown below:

In the claims,

Column 11, line 3, "A computer-readable medium memory" should be changed to --A computer-readable memory--.

Signed and Sealed this  
Eleventh Day of November, 2014

Michelle K. Lee  
*Deputy Director of the United States Patent and Trademark Office*